US009754359B2

(12) United States Patent
Yuan et al.

(10) Patent No.: US 9,754,359 B2
(45) Date of Patent: *Sep. 5, 2017

(54) IDENTIFYING PREVIOUSLY-BLURRED AREAS FOR CREATING A BLUR EFFECT FOR AN IMAGE

(71) Applicant: Splunk Inc., San Francisco, CA (US)

(72) Inventors: Shiming Yuan, Shanghai (CN); Qianjie Zhong, Shanghai (CN); Ting Wang, Shanghai (CN); Tianli Zhang, Shanghai (CN)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,302

(22) Filed: Apr. 3, 2017

(65) Prior Publication Data
US 2017/0206639 A1 Jul. 20, 2017

Related U.S. Application Data

(63) Continuation of application No. 14/396,277, filed as application No. PCT/CN2014/081911 on Jul. 9, 2014, now Pat. No. 9,646,398.

(51) Int. Cl.
*G06T 5/00* (2006.01)
*G06T 11/60* (2006.01)

(52) U.S. Cl.
CPC .............. *G06T 5/002* (2013.01); *G06T 11/60* (2013.01); *G06T 2207/20012* (2013.01)

(58) Field of Classification Search
CPC .................................. G06T 11/60; G06T 5/002
See application file for complete search history.

(56) References Cited

U.S. PATENT DOCUMENTS

| 5,953,076 A * | 9/1999 | Astle ...................... G06T 7/246 348/580 |
| 6,377,269 B1 * | 4/2002 | Kay ........................ G06T 11/60 345/589 |
| 8,364,712 B2 * | 1/2013 | O'Sullivan ......... G06F 17/3087 707/783 |
| 9,076,231 B1 * | 7/2015 | Hill ....................... G06T 3/4023 |
| 2002/0093686 A1 * | 7/2002 | Fan .................... H04N 1/40075 358/3.08 |

(Continued)

OTHER PUBLICATIONS

International Search Report and Written Opinion for PCT/CN2014/081911, dated Apr. 15, 2015, 11 pages.
(Continued)

*Primary Examiner* — Sean Motsinger
(74) *Attorney, Agent, or Firm* — Lowenstein Sandler LLP

(57) ABSTRACT

A processing device receives input representing a selection of a first area of an image. The processing device determines whether the first selected area of the image corresponds to a blurred area previously created for a second selected area of the image. The blurred area is previously created for the second selected area of the image having a size that is less than a size of the image. The processing device replaces, responsive to determining that the first selected area of the image corresponds to the blurred area previously created for the second selected area of the image, the first selected area of the image with a corresponding portion of the blurred area previously created for the second selected area of the image.

27 Claims, 10 Drawing Sheets

(56) References Cited

U.S. PATENT DOCUMENTS

| | | | |
|---|---|---|---|
| 2003/0108240 A1* | 6/2003 | Gutta | G06T 5/002 382/181 |
| 2003/0115481 A1* | 6/2003 | Baird | G06F 21/6218 726/4 |
| 2004/0196255 A1* | 10/2004 | Cheng | G06F 3/0488 345/104 |
| 2005/0270371 A1* | 12/2005 | Sablak | G06T 3/00 348/143 |
| 2005/0275723 A1* | 12/2005 | Sablak | G06T 7/194 348/169 |
| 2006/0105299 A1* | 5/2006 | Ferris | G09B 19/00 434/11 |
| 2008/0235221 A1* | 9/2008 | Burns | G06F 17/30716 |
| 2009/0019379 A1* | 1/2009 | Pendergast | G06F 17/30011 715/762 |
| 2009/0060343 A1* | 3/2009 | Rosca | G09C 5/00 382/190 |
| 2009/0262987 A1* | 10/2009 | Ioffe | G06K 9/00281 382/118 |
| 2013/0004090 A1* | 1/2013 | Kundu | G07F 19/207 382/232 |
| 2013/0027417 A1 | 1/2013 | Merrell et al. | |
| 2014/0002487 A1* | 1/2014 | Marison | G09G 5/14 345/629 |
| 2014/0078172 A1* | 3/2014 | Systrom | G06T 5/002 345/629 |
| 2015/0030246 A1* | 1/2015 | Wilensky | G06T 11/60 382/167 |
| 2015/0145992 A1* | 5/2015 | Traff | G06T 11/60 348/143 |
| 2015/0296170 A1* | 10/2015 | Farrell | H04N 5/913 386/254 |
| 2015/0371049 A1* | 12/2015 | Xavier | G06T 11/60 726/26 |
| 2016/0054839 A1* | 2/2016 | Kintzlinger | G06T 11/60 345/173 |
| 2016/0253830 A1* | 9/2016 | Yuan | G06T 5/002 382/279 |

OTHER PUBLICATIONS

U.S., Office Action for U.S. Appl. No. 14/396,277, dated Aug. 25, 2016.

U.S., Notice of Allowance for U.S. Appl. No. 14/396,277, dated Feb. 28, 2017.

\* cited by examiner

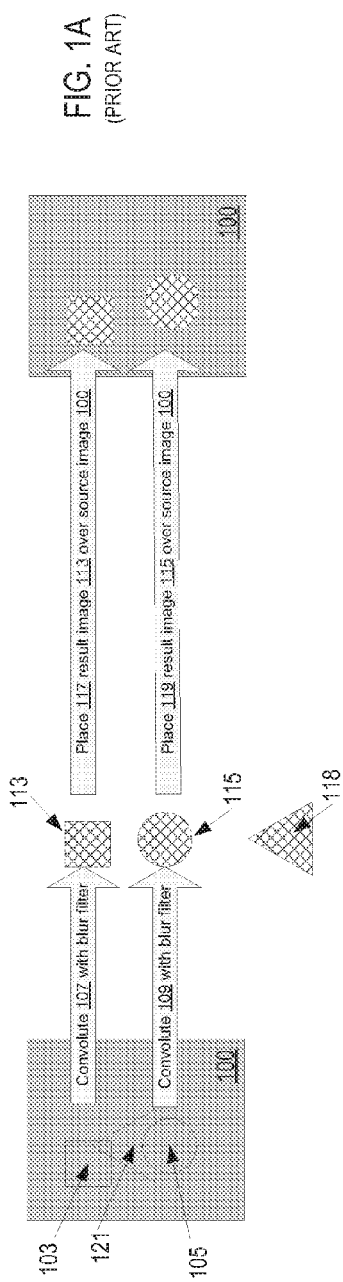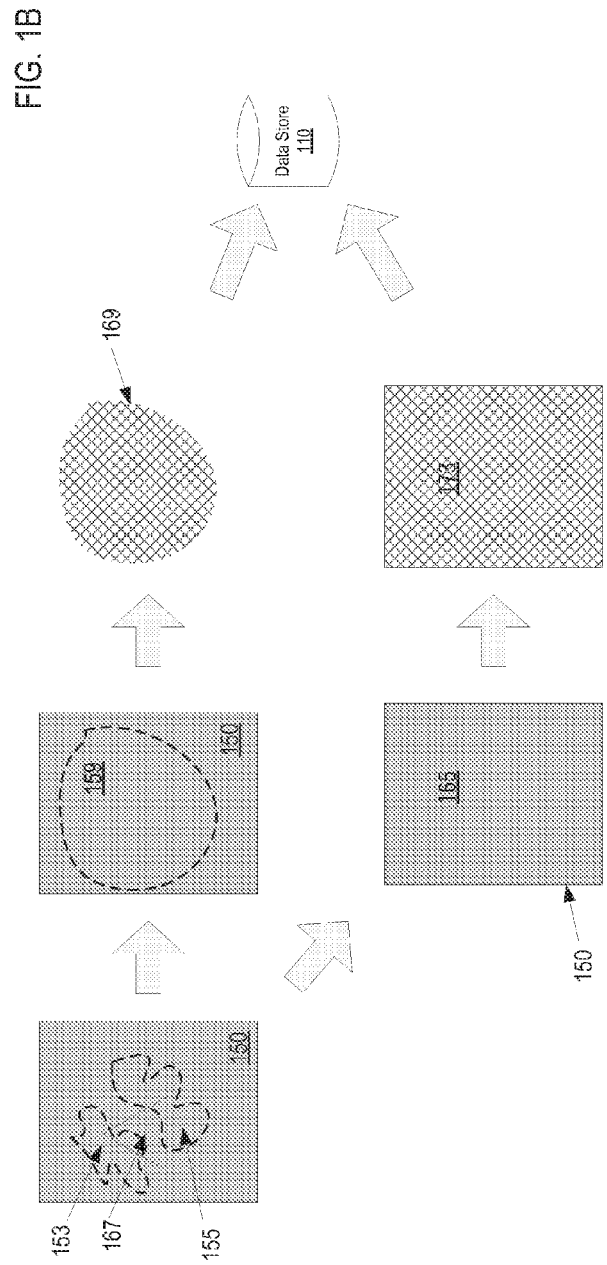

IDENTIFYING PREVIOUSLY-BLURRED AREAS FOR CREATING A BLUR EFFECT FOR AN IMAGE

RELATED APPLICATIONS

This application is a continuation of U.S. patent application Ser. No. 14/396,277, filed on Oct. 22, 2014, which is the U.S. National Stage Application of International Application No. PCT/CN2014/081911, filed on Jul. 9, 2014. The entire contents of both above-referenced applications are incorporated by reference herein.

TECHNICAL FIELD

The present disclosure relates to blurring an image and, more particularly, to a technique of minimizing blur operations for creating a blur effect for an image.

BACKGROUND

Blurring of an image is the appearance of the image or at least an area of the image as out of focus. Blurring can be caused, for example, when an object moves relative to a camera or if the object is out of focus. Blur is a commonly used effect in computer applications. There are various traditional methods for creating a blur effect of an image. For example, to apply a blur effect to an image in a computer application, a convolution operation is typically used. Convolution is producing a new image for the image area to be blurred by calculating weighted averages of pixels in the image area to be blurred to create each pixel of the new image.

Some operating systems use a framework with a blur filter to add a blur effect to an image. Examples of conventional frameworks include Core Image, vImage, and GPUImage. These conventional frameworks create a blur effect for an image generally in the same manner. For example, conventional frameworks can allow a user to select an area of a source image to be blurred, and then convolute the selected area from the source image to create a new blurred image of the selected area, and overlap the source image with the new blurred image to create the blur effect. Generally, for a single blur operation, the larger the size of the area to be blurred, the more resources (e.g., central processing unit (CPU) time and memory) it can take to produce the final result of the blur effect for the source image. With multiple blur operations, the resource consumption is likely to grow exponentially.

BRIEF DESCRIPTION OF THE DRAWINGS

The present disclosure will be understood more fully from the detailed description given below and from the accompanying drawings of various implementations of the disclosure.

FIG. 1A illustrates an example blur effect on an example image.

FIG. 1B illustrates an example blur effect on an example image using a defined area, in accordance with various implementations.

DETAILED DESCRIPTION

Figure 2:
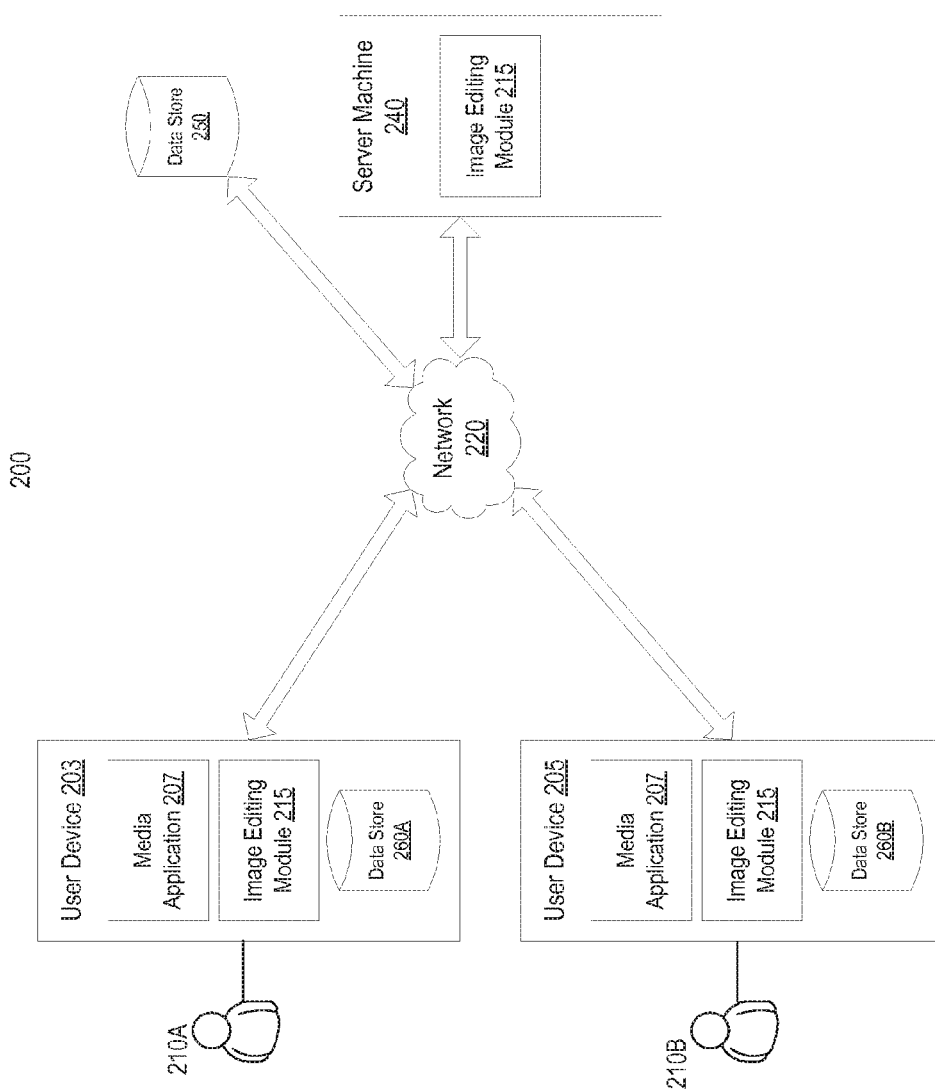
FIG. 2 illustrates example system architecture in which aspects of the present disclosure can be implemented.

The present disclosure is directed to minimizing blur operations for creating a blur effect for an image. Implementations of the present disclosure perform image filtering (e.g., image blurring) more efficiently than traditional solutions by minimizing the number of operations to be performed.

Referring to FIG. 1A, in a traditional solution, a user may select an area (e.g., area 103) to blur in a source image 100. The source image 100 may be, for example, a digital photo of a group of people, and the selected area 103 may include the face of a person, which the user wishes to conceal with a blur effect.

To create a blur of a selected area 103, traditional blurring solutions convolute 107 the selected area 103 with a blur filter (e.g., Gaussian filter, motion filter) to produce a result image (blurred image 113) for the selected area 103. Convolution involves calculating weighted averages of pixels in an area (e.g., selected area 103) to create each pixel of the result image (e.g., result image 113). Convolution can use a pixel matrix (e.g., 3×3 pixel matrix) to create a result image. For example, a source pixel in the selected area 103 and its surrounding pixels, within a 3×3 pixel matrix of the source pixel, can be mathematically merged to produce a single destination pixel in the blurred image 113. The pixel matrix can slide across the surface of the selected area 103 to produce destination pixels for the result image. Traditional solutions generally use the pixels of the selected area 103 as the input to a blur filter. For example, traditionally, the pixel matrix slides across the pixels of the selected area 103.

When a user selects multiple areas (e.g., selected area 103, selected area 105) in a source image 100 to blur, traditional solutions usually perform multiple blur operations. Traditional solutions perform multiple blur operation by executing a blur operation for each selected area. That is, traditional blurring solutions typically perform a first blur operation to convolute 107 the pixels in the selected area 103 to create a corresponding result image (blurred image 113), and perform a second blur operation to convolute 109 the pixels in the selected area 105 to create a corresponding result image (blurred image 115). With conventional blurring solutions, the result image (e.g., result image 113,115)

that corresponds to a selected area is typically the same shape and size as the selected area (e.g., area 103,105) since the input to the blur filter is the pixels in the corresponding selected area. Traditional blurring solutions then separately place 117,119 the individual result images (e.g., blurred images 113,115) over the source image 100 to add a blur effect to the source image 100.

The user may subsequently select another area 121 to blur from the source image 100. The other selected area 121 may have sub-areas that overlap with the previously selected areas 103,105. Since traditional blurring solutions generally use the pixels in the selected area (e.g., selected area 121) as the input to a blur filter, traditional blurring solutions would typically perform another blur operation using the pixels of the other selected area 121 as input to create a separate result image (e.g., blurred image 118) for the other selected area 121, and then place the blurred image 118 over the source image 100. That is, even though some of the selected areas 103,105,121 contain common sub-areas, and some of the input (e.g., pixels) is common to the various blur operations, conventional blurring solutions perform a separate blur operation for each selected area 103, 105, 121, resulting in multiple and redundant operations for the common pixel input.

Implementations of the present disclosure can minimize the number of operations to be performed when blurring multiple selected areas of a source image. Unlike traditional blurring solutions that generally use the pixels of a selected area (e.g., selected area 103) as the input to a blur filter, implementations of the present disclosure use a defined area, which is larger than the selected area, as input to a blur filter. FIG. 1B illustrates a blur effect on an example image using a defined area, which encompasses one or more selected areas and is larger than the selected area(s), as the input to a blur filter, in accordance with some implementations.

Referring to FIG. 1B, source image 150 may be, for example, a digital version of a company's financial report, and the selected areas 153,155 may have custom shapes (e.g., irregular shapes, pre-defined shapes) that include financial data which the user wishes to conceal with a blur effect. A user may select multiple areas (e.g., area 153, area 155) to blur in source image 150.

Implementations of the present disclosure can perform a single blur operation to create a single result image corresponding to the multiple separate sub-areas (e.g., area 153, area 155). Performing the single blur operation to create the single result image minimizes a number of blur operations being performed relative to applying a same blur filter to the multiple separate sub-areas. Implementations of the present disclosure define an area that is large enough to encompass the selected areas 153,155 and use the defined area as input to a blur filter. The defined area can be part of the source image 150, such as area 159, or the defined area can be the area 165 of the entire source image 150.

Unlike traditional solutions, which would generally perform two blur operations using the multiple selected areas as separate input to create separate result images for the separate selected areas 153,155, implementations of the present disclosure reduce the number of blur operations to perform by executing a single blur operation to blur the defined area, which encompasses the selected areas 153,155, to create a single result image. For example, if the defined area is area 159, implementations of the present disclosure can perform a single blur operation to create a corresponding single result image 169 and can store the result image 169 in a data store 110. In another example, if the defined area is area 165, implementations of the present disclosure can perform a single blur operation to create a corresponding single result image 173 and can store the result image 173 in the data store 110. Implementations of the present disclosure can use and re-use a single result image (e.g., result image 169 or result image 173) to add the blur effect for various selected areas (e.g., selected areas 153,155) of the same source image.

Implementations of the present disclosure can receive multiple requests to edit (e.g., blur) the same source image 150 and can use a result image that is stored in the data store 110 to respond to the requests. The requests may be subsequent requests, and may be from the same user and/or different users. For example, a user may subsequently select another area 167 to blur from the source image 150. Unlike conventional solutions, which would typically use the pixels of selected area 167 to perform an additional blur operation to create a corresponding result image for the selected area 167, implementations of the present disclosure can reuse a result image (e.g., result image 169 or result image 173) that is already stored in the data store 110, as will be discussed in greater detail below in conjunction with FIG. 5. By using an already existing result image from the data store 110 to respond to multiple image editing requests, implementations of the present disclosure eliminate redundant operations, which would typically be performed by conventional image editing solutions.

FIG. 2 illustrates example system architecture 200 in which aspects of the present disclosure can be implemented. The system architecture 200 can include one or more user devices 203,205, one or more server machines 240, and one or more data stores 250 coupled to each other over one or more networks 220. The one or more networks 220 can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof. In one implementation, some components of architecture 200 are not directly connected to each other. In one implementation, architecture 200 includes separate networks 220. The machines 240 can be a rack-mount server computer, a router computer, a personal computer, a portable digital assistant, a mobile phone, a laptop computer, a tablet computer, a camera, a video camera, a netbook, a desktop computer, a media center, or any combination of the above.

The data stores 250 can store media items, such as, and not limited to, digital images, digital photos, digital documents, digital video, digital movies, digital music, mobile application content, website content, social media updates, electronic books (ebooks), electronic magazines, digital newspapers, digital audio books, electronic journals, web blogs, real simple syndication (RSS) feeds, electronic comic books, software applications, etc. For brevity and simplicity, a digital image and image are used as an example of a media item throughout this document. A data store can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items. In some implementations of the present disclosure, a data store 250 is a network-attached file server. In some implementations of the present disclosure, a data store 250 is some other type of persistent storage, such as an object-oriented database, a relational database, and so forth.

The user devices 203,205 can be portable computing devices such as a cellular telephones, personal digital assistants (PDAs), portable media players, netbooks, laptop computers, an electronic book reader or a tablet computer (e.g., that includes a book reader application), a set-top box, a gaming console, a television, and the like. The user devices 203,205 can include one or more data stores 260A,B to store data.

Users 210A,B can access data that is stored in the data store 250 via user devices 203,205. The user devices 203, 205 can run an operating system (OS) that manages hardware and software of the user devices 203,205. A media application 207 can run on the user devices 203,205 (e.g., on the OS of the user devices). For example, the media application 207 may be a web browser that can access content served by an application server (e.g., server machine 240). In another example, the media application 207 may be a mobile application (e.g., an app) that can access content served by a mobile application server (e.g., server machine 240).

The server machine 240 can provide web applications and/or mobile device applications and data for the user devices 203, 205. One or more data stores 250 can include data to be protected from data loss, such as data that is sensitive and/or confidential. Data in the data stores 250 can be classified as data to be protected, for example, based on configuration parameters stored in the data store 250 and/or specified by a user (e.g., system administrator).

The user devices 203,205 can include an image editing module 215 to edit an image. Examples of editing an image can include, and are not limited to, blurring an image, applying a color filter to an image, and adding a watermark to an image. For example, a user 210A may generate a dashboard image using user device 203 and data that is stored in data store 250.

Figure 3:
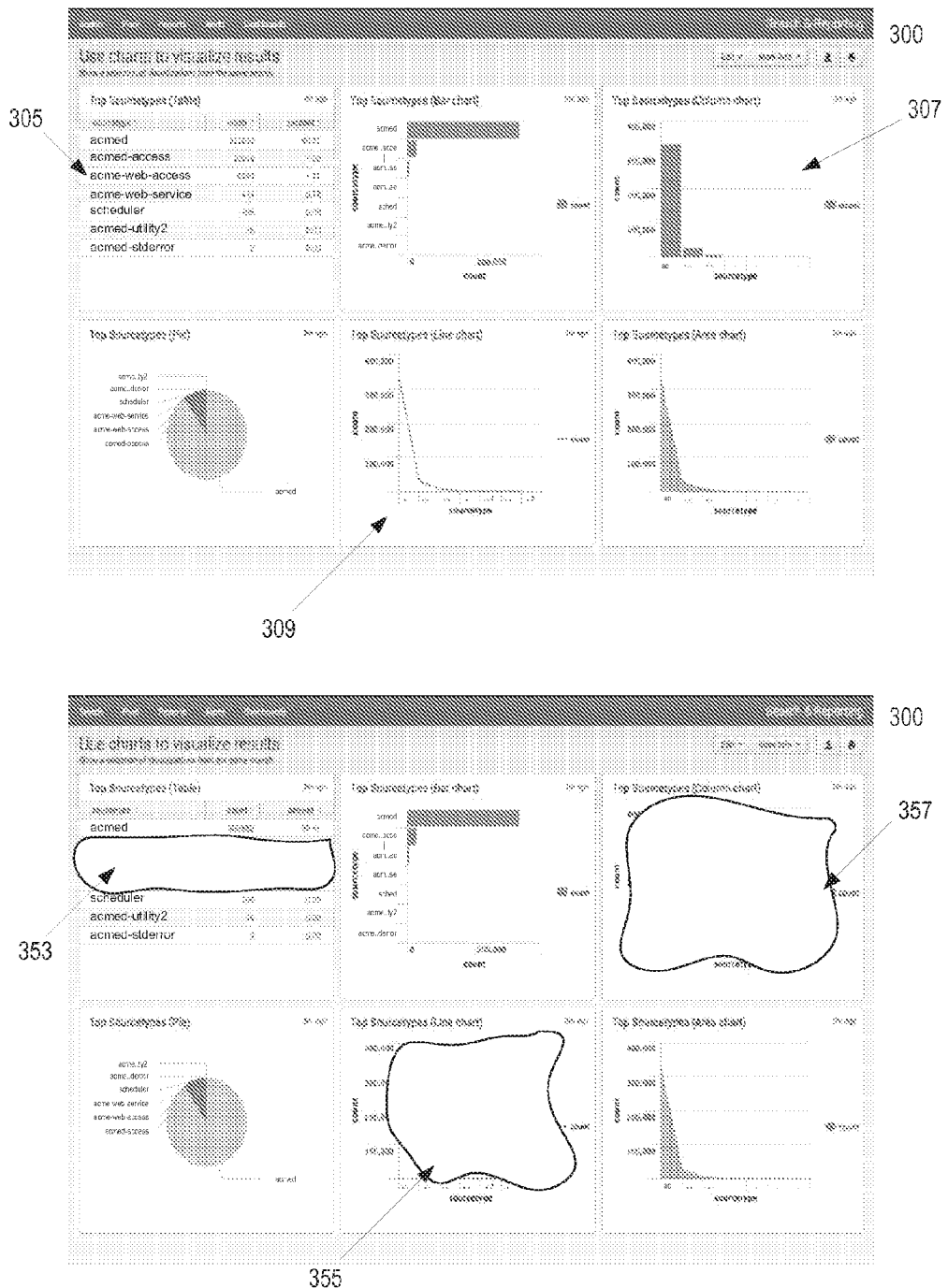
FIG. 3 illustrates an example of creating a blur effect for custom shapes on an example dashboard image, in accordance with various implementations

FIG. 3 illustrates an example of creating a blur effect for custom shapes on an example dashboard image 300, in accordance with various implementations. In information management, a dashboard is a user interface (e.g., graphical user interface) showing a graphical presentation of the current status (snapshot) and trends of performance to enable informed decisions to be made at a glance. An image of the dashboard can be created. The dashboard image 300 can include confidential data 305,307,309. The dashboard image 300 can be generated using a late binding schema and at a particular moment in time. A late binding schema is described in greater detail below. A user 210A may wish to share the dashboard image 300 with another user 210B, but may wish to conceal the confidential data 305,307,309 when sharing the dashboard image 300. The user 210A can provide input specifying selected areas 353,355,357 in the source image (e.g., dashboard image 300). The image editing module 215 can use the input to define an area that encompasses the selected areas 353,355,357 and use the defined area to create, for example, a blur effect for the selected areas 353,355,357 to conceal the confidential data 305,307,309 in the dashboard image 300 for sharing with user 210B.

Figure 4:
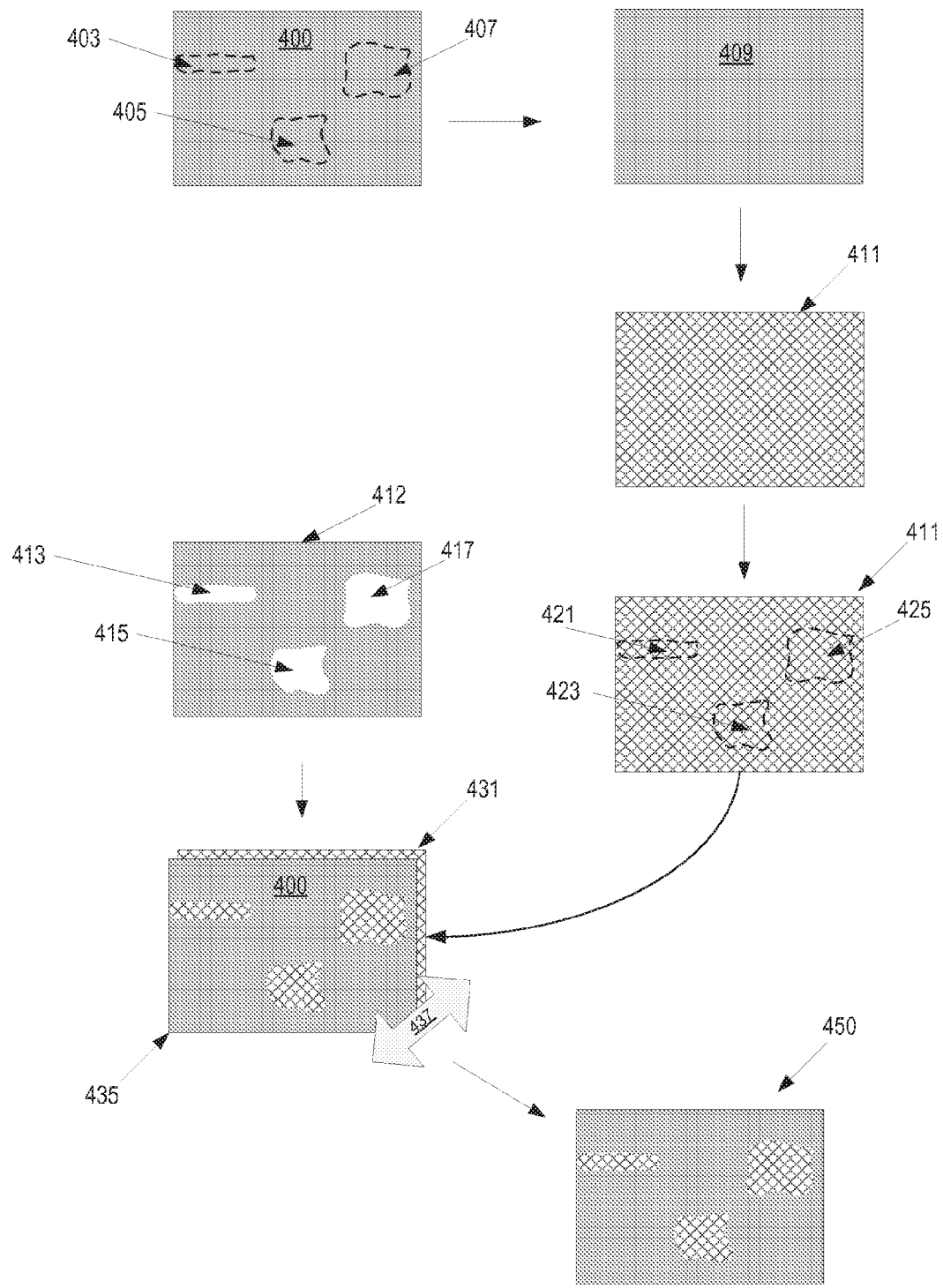
FIG. 4 illustrates an example of creating a blur effect for multiple custom shapes on an example source image by executing a single blur operation, in accordance with various implementations.

Unlike traditional editing solutions, the image editing module 215 can edit (e.g., blur) multiple areas of an image by applying a filter to the multiple areas of the image in a single process. A "single process" hereinafter refers to executing a single filter operation, such as executing a single blur operation with respect to multiple areas selected by a user for blurring. As described above, a blur operation refers to calculating weighted averages of pixels in an area in the source image to create each pixel of a result image. FIG. 4 illustrates an example of creating a blur effect for multiple custom shapes on an example source image 400 by executing a single blur operation, in accordance with various implementations. The source image 400 may be a dashboard image (e.g., dashboard image 300 in FIG. 3), a digital photo of a group of people, or any other image. The image editing module 215 can receive input identifying multiple, separately selected areas 403,405,407. The image editing module 215 can define an area 409 in the source image 400 that includes the selected areas 403,405,407 and can create a single corresponding result image 411. For example, the defined area 409 can be the area of the entire source image 400, and the image editing module 215 can use the pixels of the defined area 409 as input to a blur filter (e.g., Gaussian filter, motion filter, box filter, spin filter, zoom filter) to produce the result image 411. The result image 411 is a blur of the defined area 409. The image editing module 215 performs a single blur operation on the defined area 409 to create the single result image 411. The image editing module 215 can define the area 409 based on user input and/or configuration parameters that are stored in a data store (e.g., data stores 250,260A,B in FIG. 2).

To create the blur effect for the selected areas 403,405, 407, the image editing module 215 transforms the source image 400 into a transformed image 412 by changing the selected areas 403,405,407 in the source image 400 into transparent areas 413,415,417. The image editing module 215 aligns portions of the result image 411 with the transparent areas 413,415,417 in the transformed image 412. In one implementation, the image editing module 215 places the transformed image 412 containing the transparent areas 413,415,417 in the foreground 435 and places the result image 411 in the background 431. The image editing module 215 creates 437 an alignment such that the transparent areas 413,415,417 and the portions 421,423,425 of the result image 411 that correspond to the transparent areas 413,415, 417 are in the same position. The portions 421,423,425 of the result image 411 that correspond to the transparent areas 413,415,417 in the transformed image 412 are revealed through the transparent areas 413,415,417 to create an edited image 450. That is, the portions 421,423,425 of the result image 411 that correspond to the transparent areas 413,415, 417 include the blur effect and are revealed via the corresponding transparent areas 413,415,417. The edited image 450 can be stored in a data store and can be shared, for example, with another user 210B. The edited image 450 can include a foreground layer containing the transparent areas 413,415,417 and a background layer containing the portions 421,423,425 of the result image 411 that correspond to the transparent areas 413,415,417.

Returning to FIG. 2, the edited image (e.g., edited image 450 in FIG. 4) can be stored in data store 260A, data store 260B, and/or data store 250. The image editing module 215 can also store the result image (e.g., result image 411 in FIG. 4) in a data store (e.g., data stores 250,260A,B). In one implementation, the image editing module 215 resides in a user device 203,205, and the result image is stored in a corresponding data store (e.g., data store 260A in user device 203, data store 260B in user device 205). In another implementation, the image editing module 215 resides in a server machine 240, and the result image is stored in a data store (e.g., data store 250) that is coupled to the server machine 240. The user (e.g., user 210A or user 210B) may subsequently select another area from the same source image and request that the other selected area be blurred. The image editing module 215 can use the result image (e.g., result image 411 in FIG. 4) that is stored in a data store (e.g., data store 260A, data store 260B, data store 250) to respond to the request.

Figure 5:
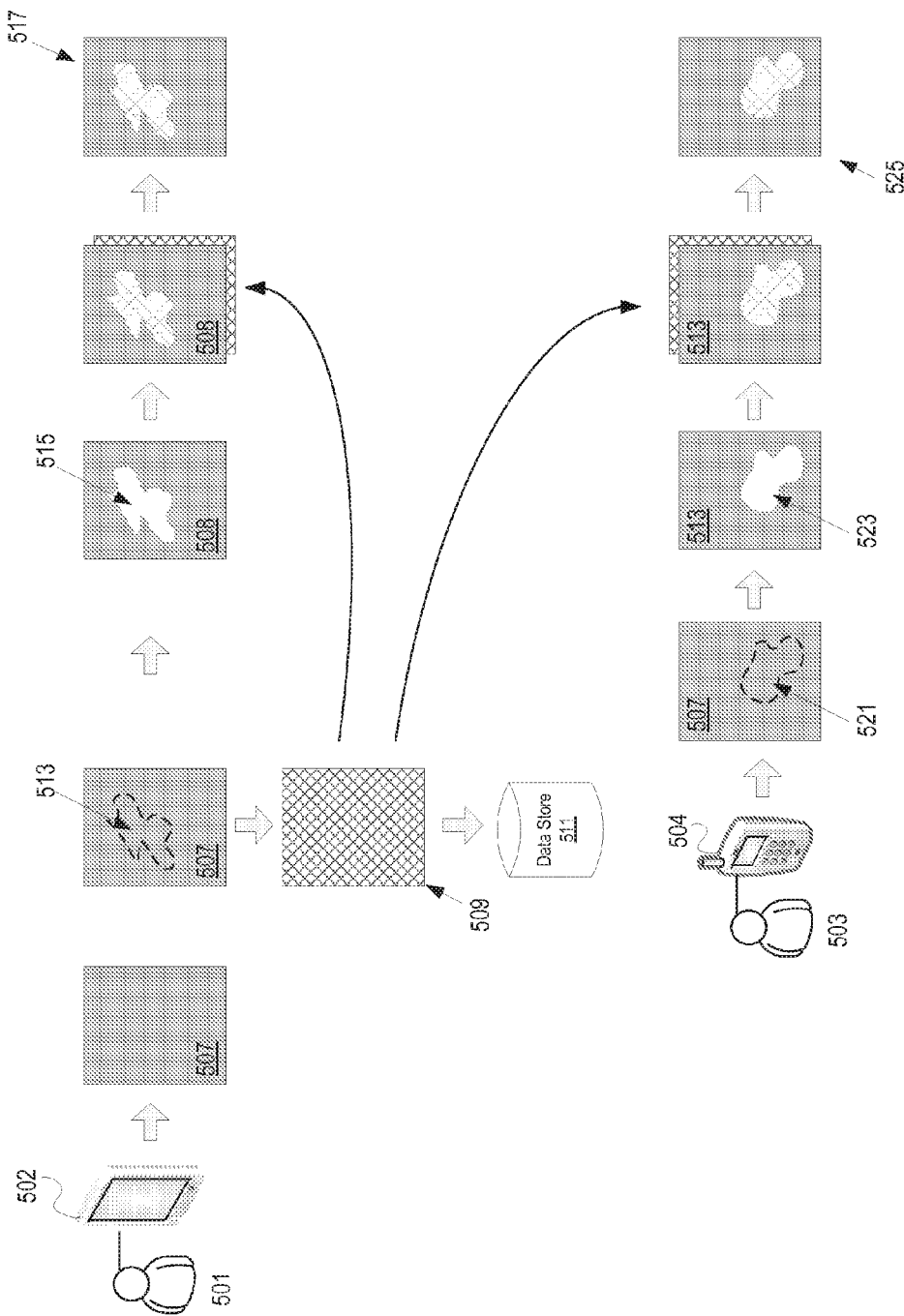
FIG. 5 illustrates an example of minimizing the number of editing operations for responding to multiple requests to edit the same source image with the same filter, in accordance with various implementations.

FIG. 5 illustrates an example of minimizing the number of editing (e.g., blurring) operations for responding to multiple requests to edit the same source image with the same filter, in accordance with various implementations. A user 501 can use a user device 502 to select a source image 507 and one or more areas (e.g., selected area 513) to blur in the source image 507. The source image 507 can be stored in a data store of the user device 502. The image editing module 215 can define an area (e.g., entire source image 507 area) that encompasses the selected area 513 and can convolute the defined area using the pixels of the defined area as input to a blur filter (e.g., Gaussian filter, motion filter, box filter, spin filter, zoom filter) to create a result image 509. The image editing module 215 can store the result image 509, which corresponds to the source image 507 and the selected area 513, in a data store 511. In one implementation, the data store 511 is a data store that is local to the user device 502. Alternatively, the data store 511 is a centralized data store accessible to user devices 502,504, for example, via one or more networks. In one implementation, the image editing module 215 on the user device 502 sends the result image 509 to a server machine (e.g., server machine 240 in FIG. 2) via the one or more networks, and the server machine stores the result image 509 in the data store 511. In one implementation, the result image 509 is stored on one or more data stores of one or more user devices and a centralized data store.

In one implementation, the user device 502 sends the source image 507 and input data describing the selected area 513 to the server machine, and the server machine creates the result image 509 and stores the result image 509 in the data store 511. The server machine can send the result image 511 to the image editing module 215 on the user devices 502,504.

The image editing module 215 on the user device 502 can create a transformed image 508 that corresponds to the source image 507. The transformed image 508 can include a transparent area 515 that corresponds to the selected area 513. The image editing module 215 can place the transformed image 508 in the foreground and the result image 509 in the background. The image editing module 215 can align a portion of the result image 509 that corresponds to the transparent area 515 in the transformed image 508 to be in the same position as the transparent area 515 to create an edited image 517. The edited image 517 reveals the blurred portion of the result image 509 that corresponds to the transparent area 515 in the transformed image through the transparent area 515.

There may be another request to use the same blur filter to add a blur effect to the same source image 507. For example, the request may be from another user device 504. In another example, the request may be from the same user device 502. The user can be a different user (e.g., user 503) or the same user (e.g., user 501). The request may be for a different selected area 521 of the same source image 507. The image editing module 215, for example, on the user device 504 can receive user input of the selected area 521 to blur. In one implementation, the image editing module 215 on the user device 504 determines whether a local data store on the user device 504 stores a result image that corresponds to the source image. In another implementation, the user device 504 sends a request to the server machine for a result image (e.g., result image 509), which may be stored in a centralized data store, that corresponds to the source image 507. In one implementation, the image editing module can determine whether there is a corresponding result image in a local data, and if not, send a request to a server machine for a corresponding result image.

If there is not a corresponding result image in a data store (e.g., local data store, centralized data store), the image editing module on the user device 504 or the image editing module on a server machine, can create a result image for the source image 507. If there is a corresponding result image in the data store (e.g., data store 511), the user device 504 can receive the result image 509 for example, from the server machine, and can avoid performing any blur operations by reusing the result image 509 from the data store 511, thus reducing the amount of resources (e.g., central processing unit (CPU) time and memory) used to create the blur effect. The image editing module 215 can create a transformed image 513 that includes the source image 507 and a transparent area 523 that corresponds to the selected area 521. The user device 504 can place the transformed image 513 in the foreground and the result image 509 in the background. The user device 504 can align a portion of the result image 509, which corresponds to the transparent area 523 in the transformed image 513, to be in the same position as the transparent area 523 to create an edited image 525. The edited image 525 reveals the blurred portion of the result image 509 that corresponds to the transparent area 523 in the transformed image 513 through the transparent area 523.

Figure 6:
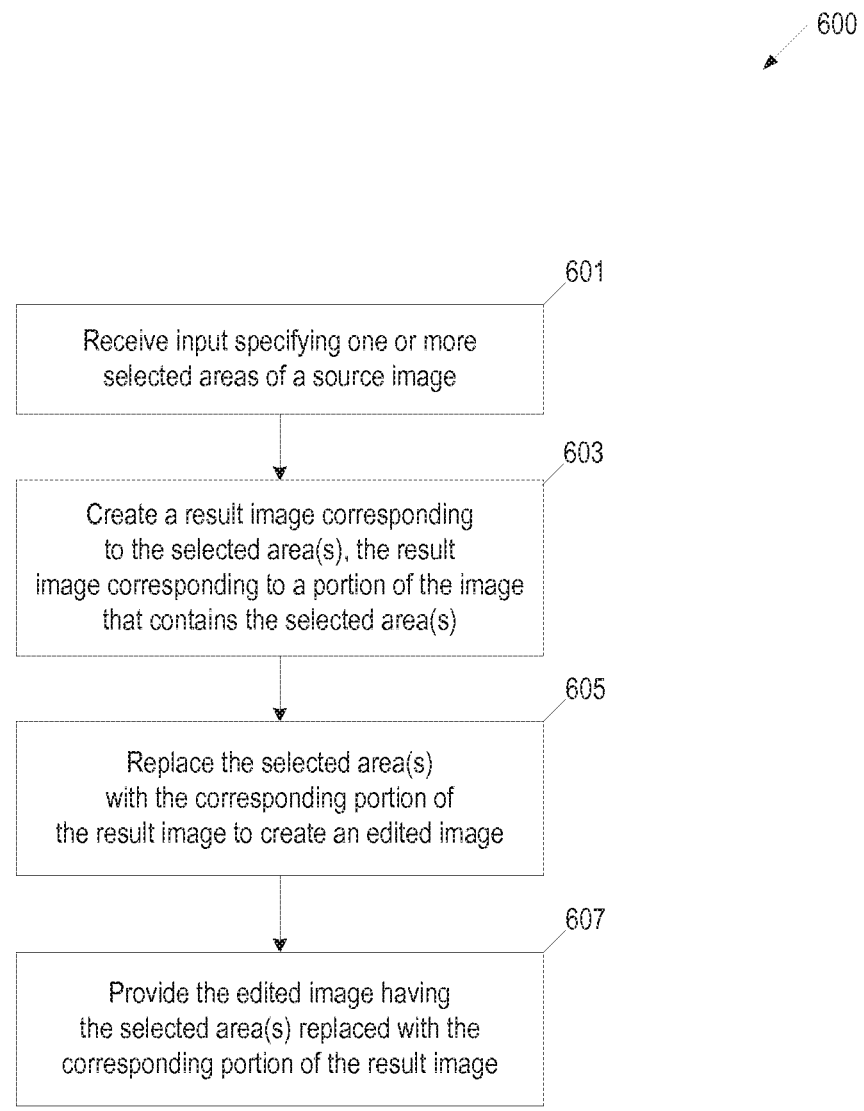
FIG. 6 is a flow diagram of an implementation of a method for editing an image.

FIG. 6 is a flow diagram of an implementation of a method 600 for editing (e.g., blurring) an image. The method may be performed by processing logic that may comprise hardware (circuitry, dedicated logic, etc.), software (such as is run on a general purpose computer system or a dedicated machine), or a combination of both. In one implementation, the method 600 is performed by the image editing module 215 on a user device 203,205 in FIG. 2. In another implementation, one or more portions of method 600 are performed by an image editing module 215 on a server machine (e.g., server machine 240 in FIG. 2) coupled to the user device over one or more networks.

At block 601, the image editing module receives input representing a selection of one or more areas of a source image. The image editing module can receive a request, for example, to blur a source image, and the request can include the input specifying the selected area(s) to be blurred. The selected area(s) can include one or more separate sub-areas of the source image. The selected area(s) can include one or more areas of random or irregular shape(s) and/or pre-defined shape(s). Some traditional blurring solutions limit the selected area(s) of a source image to a pre-defined shape such as a rectangle, a square, a circle, an ellipse, or a triangle. For example, a conventional blurring solution may provide a user with a list of shapes to use as a blurring tool. Implementations of the present disclosure can blur areas of a source image that are not limited to a pre-defined shape.

The input specifying the selected area(s) can be user input received via a user interface (e.g., graphical user interface) and/or an input device. For example, a user may provide input using a touch screen of a user device to select area(s) in the source image. The input can be in the form of x-y coordinates for the various points in the selected area(s). The one or more selected areas can include data to be protected and/or data derived from one or more data stores. The data can be derived using a late binding schema as described in greater detail below. For example, a dashboard image can be generated using data extracted via a late binding schema.

The dashboard image can be generated at a particular point in time and can include data corresponding to the particular point in time. The user input can specify a selection of the data to be blurred in the dashboard image.

At block 603, the image editing module creates a result image that corresponds to the selected area(s). The result image can be a blur of a part of the source image or a blur of the entire image. That is, the result image corresponds to a portion of the source image that contains the selected area(s). The portion of the image has a size that is greater than an aggregate size of the selected area(s). The selected area(s) have an aggregate size that is less than the size of the blurred area. The blurred area corresponds to a blurring of a single portion of the result image that contains the multiple separate selected areas in the source image. For example, the result image is a blurred image that has a size of the source image and the one or more selected areas have a total size that is less than the size of the source image. To create the result image (e.g., blurred image), the image editing module defines an area of the source image that encompasses the selected area(s) and convolutes the defined area with a filter (e.g., Gaussian filter, motion filter, box filter, spin filter, zoom filter) to produce a single result image for the selected area(s). Unlike conventional solutions, which use the pixels of separate selected area(s) as separate inputs to perform multiple blur operations and create multiple result images for multiple selected areas, the image editing module uses the pixels of the defined area as input to a blur filter to execute a single blur operation on the defined area to create a single result image that corresponds to the multiple selected areas.

The image editing module can define the area of the source image that encompasses the selected area(s) based on configuration parameters that are stored in a data store. For example, the selected area(s) of the source image may be a portion of the source image and the configuration parameters may indicate that the defined area should be an area that covers the selected area(s) and is 25% larger than the area covering the selected area(s). In another example, the selected area(s) of the source image may be a small portion of the source image and the configuration parameters may indicate that the defined area should be the area of the entire source image. The image editing module can store the result image (e.g., result image 169, result image 173 in FIG. 1, result image 411 in FIG. 4) in a data store (e.g., data store 110 in FIG. 1).

At block 605, the image editing module replaces the selected area(s) in the source image with corresponding portion(s) of the result image to create an edited image (e.g., edited image 450 in FIG. 4). The edited image includes the blur effect. In one implementation, the image editing module replaces the selected area(s) in the source image with the corresponding portion(s) of the result image by identifying the portion(s) corresponding to the selected area(s) in the result image (e.g., based on the x-y coordinates), transforming the result image (excluding the identified portion(s)) to make the remaining part of the result image transparent, and then applying the transformed result image to the source image, as will be discussed in more detail below in conjunction with FIG. 8. In another implementation, the image editing module replaces the selected area(s) in the source image with the corresponding portion(s) of the result image by transforming the source image to make the selected portion(s) of the source image transparent (but not the remaining part of the result image) and then combining the transformed source image with the result image, as will be described in greater detail below in conjunction with FIG. 7.

At block 607, the image editing module provides the edited image having the selected area(s) replaced with the corresponding portion(s) of the result image. For example, the image editing module can provide the edited image, which includes the blur effect, to a user, and the user can share the edited image, for example, with another user. The selected area(s) can correspond to data to be protected and the edited image can conceal the data to be protected. In one implementation, the image editing module receives a request to blur a different selected area of the same source image. The different selected area can include a sub-area that is not in included in any previously selected area(s). The image editing module can respond to the request by replacing the different selected area of the source image with a corresponding portion of the result image.

Figure 7:
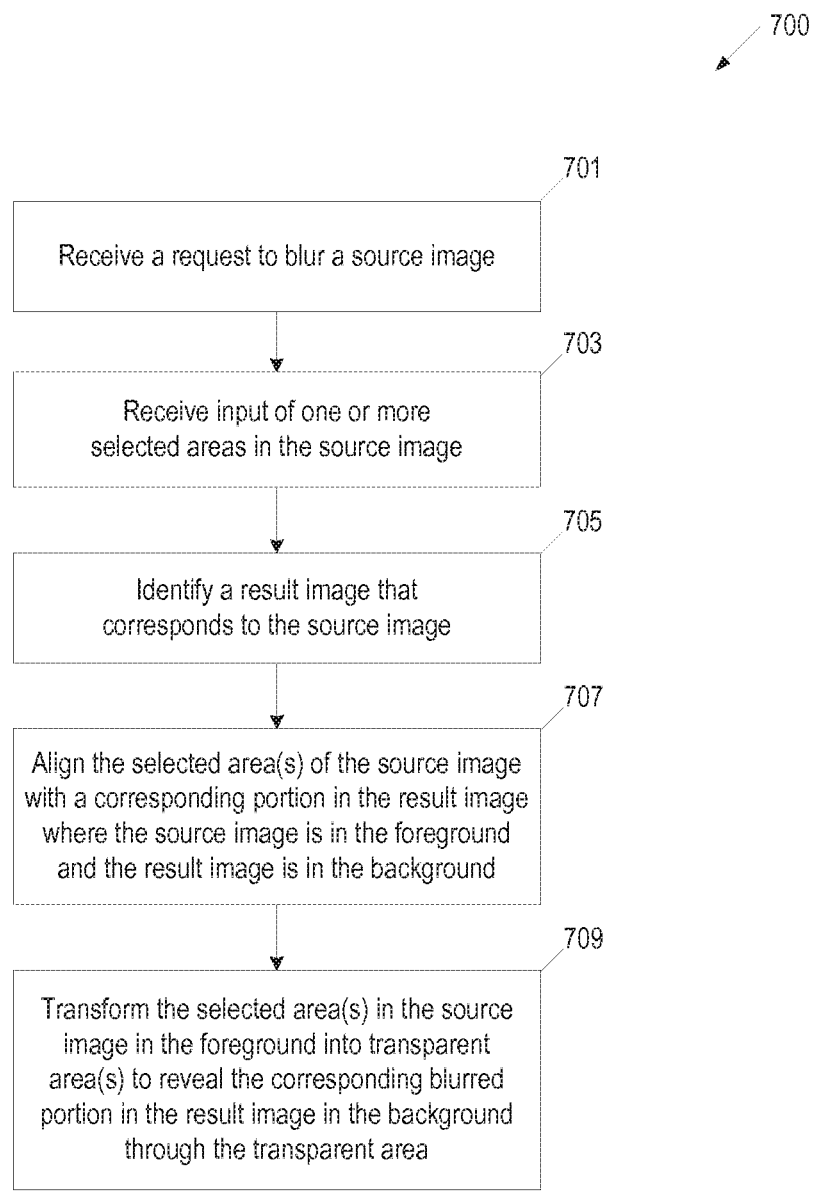
FIG. 7 is a flow diagram of an implementation of a method for replacing one or more selected areas with a corresponding portion of a result image.

FIG. 7 is a flow diagram of an implementation of a method 700 for replacing one or more selected area(s) with a corresponding portion of a result image. The method may be performed by processing logic that may comprise hardware (circuitry, dedicated logic, etc.), software (such as is run on a general purpose computer system or a dedicated machine), or a combination of both. In one implementation, the method 700 is performed by the image editing module 215 on a user device 203,205 in FIG. 2. In another implementation, one or more portions of method 700 are performed by a server machine (e.g., server machine 240 in FIG. 2) coupled to the user device over one or more networks.

At block 701, the image editing module receives a request to blur a source image. At block 703, the image editing module receives input of one or more selected areas in the source image. For example, the input can be user input received via an input device (e.g., touch screen). In another example, the image editing module resides in a server machine and receives user input that is transmitted by a user device to the server machine via a network.

At block 705, the image editing module identifies a result image that corresponds to a source image. For example, the result image can be stored in a data store. The data store can include data that associates one or more result images with one or more source images, and vice versa. In one implementation, a data store stores multiple result images that correspond to the same source image. For example, as shown in FIG. 1, a data store 100 may store result image 169 and result image 173, both of which may be associated with source image 150.

Referring again to FIG. 7, at block 705, in one implementation, the image editing module determines whether the identified result image encompasses the selected area(s). For example, result image 169 may not include the selected area(s). If the identified result image does not contain the selected area(s), the image editing module selects a different result image in the data store and determines whether the different result image encompasses the selected area(s). In one implementation, if there is not a result image, which encompasses the selected area(s), in the data store, the image editing module creates a result image that encompasses the selected area(s), as was discussed in more detail above.

At block 707, the image editing module aligns the selected area(s) of the source image with a corresponding portion of the result image. The source image can be in the foreground, and the result image can be in the background. At block 709, the image editing module transforms the selected area(s) in the source image in a foreground layer into transparent area(s). Transforming the selected area(s) into transparent area(s) reveals the corresponding blurred portion in the result image in a background layer through the transparent area(s). The image editing module can superimpose the source image with the transparent areas on top of the result image in the background layer.

Figure 8:
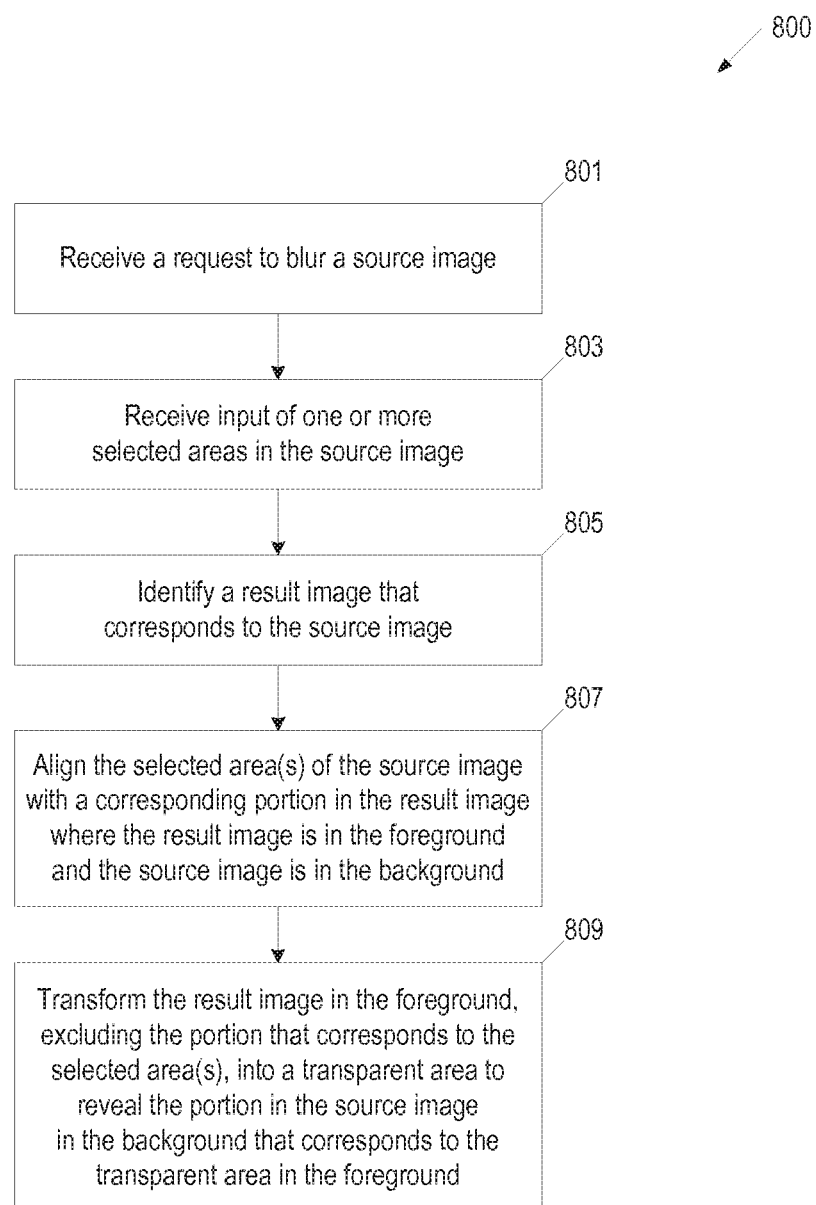
FIG. 8 is a flow diagram of an implementation of a method for replacing one or more selected areas with a corresponding portion of a result image.

FIG. 8 is a flow diagram of an implementation of a method 800 for replacing one or more selected areas with a corresponding portion of a result image. The method may be performed by processing logic that may comprise hardware (circuitry, dedicated logic, etc.), software (such as is run on a general purpose computer system or a dedicated machine), or a combination of both. In one implementation, the method 800 is performed by the image editing module 215 on a user device 203,205 in FIG. 2. In another implementation, one or more portions of method 800 are performed by a server machine (e.g., server machine 240 in FIG. 2) coupled to the user device over one or more networks.

At block 801, the image editing module receives a request to blur a source image. At block 803, the image editing module receives input of one or more selected areas in the source image. For example, the input can be user input received via an input device (e.g., touch screen). In another example, the image editing module resides in a server machine and receives user input that is transmitted by a user device to the server machine via a network.

At block 805, the image editing module identifies a result image that corresponds to the source image. In one implementation, the image editing module determines whether the identified result image encompasses the selected area(s). If the identified result image does not contain the selected area(s), the image editing module selects a different result image in the data store and determines whether the different result image encompasses the selected area(s). In one implementation, if there is not a result image, which encompasses the selected area(s), in the data store, the image editing module creates a result image that encompasses the selected area(s).

At block 807, the image editing module aligns the selected area(s) of the source image with a corresponding portion of the result image. The result image can be in the foreground and the source image can be in the background. At block 809, the image editing module transforms the result image in the foreground, excluding the portion(s) that correspond to the selected area(s), into a transparent area. Transforming the result image in the foreground reveals the corresponding portion in the source image. The image editing module can superimpose the transformed result image on top of the source image.

Figure 9:
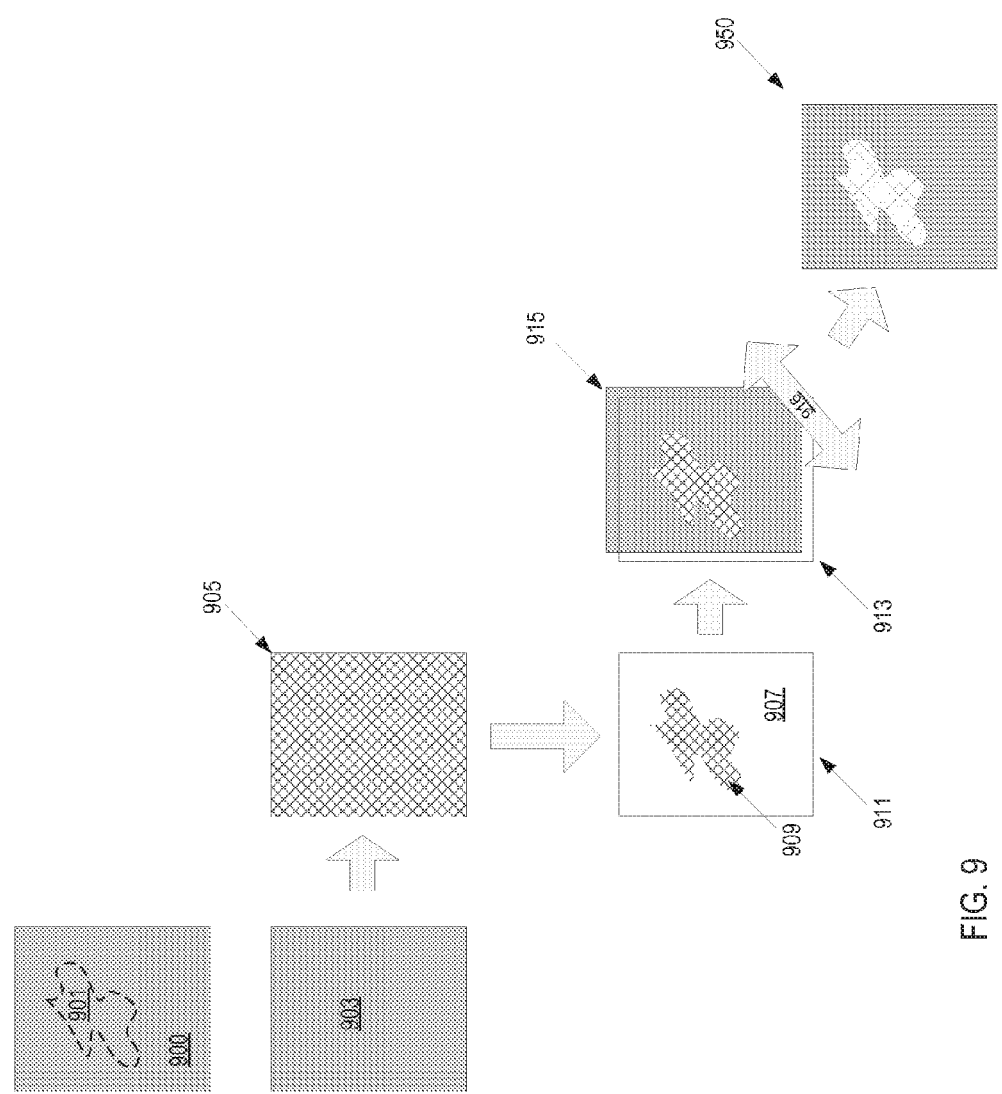
FIG. 9 is an example of replacing one or more selected areas with a corresponding portion of a result image, according to various implementations.

FIG. 9 is an example of replacing one or more selected areas with a corresponding portion of a result image, according to various implementations. FIG. 9 illustrates an example of the image editing module performing method 800 of FIG. 8. The image editing module 215 can receive input specifying one or more selected areas 901 of a source image 900. In this example, the selected area(s) 901 include an irregular shape. The image editing module 215 can define an area 903 in the source image 900 that includes the selected area(s) 901. The image editing module 215 can define the area 903 to also be larger than the combined selected area(s).

The image editing module 215 can create a result image 905 that corresponds to the defined area 903. For example, the defined area 903 is the area of the entire source image 900, and the image editing module 215 can convolute the defined area 903 with a blur filter (e.g., Gaussian filter, motion filter, box filter, spin filter, zoom filter) to produce the result image 905 for the defined area 903. The image editing module 215 performs a single blur operation to create the result image 905.

To create the blur effect for the selected area(s) 901, the image editing module 215 transforms the result image 905 to include a transparent portion 907 and blurred portion(s) 909. The blurred portion(s) 909 correspond to selected area(s) 901, and the transparent portion 907 is the remaining part of the result image, excluding the blurred portion 909. The blurred portion 909 is an irregular shape, and the image editing module can use one or more pre-defined shapes to create the irregular shape for the blurred portion 909.

The image editing module 215 aligns 916 the transformed image 911 with the source image 900. In one implementation, the image editing module 215 places the transformed image 911 in the foreground 913 and places the source image 900 in the background 915. The image editing module 215 creates an alignment such that the blurred portion(s) 909 and the selected area(s) 901 are in the same position(s). The transformed image 911 is in the foreground, and the portion of the source image 915 that corresponds to the transparent portion 907 is revealed through the transparent portion 907 to create an edited image 950. The edited image 950 can be stored in a data store and can be shared, for example, with another user.

In one implementation, the selected area(s) of an image (e.g., source image) includes data derived using a late binding schema. For example, an image (e.g., dashboard image) can be generated at a particular moment in time and using a late binding schema. Implementations of the present disclosure can process real-time data. For example, the dashboard image can include real-time performance data that corresponds to the particular moment in time. Implementations of the present disclosure can include an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described can include the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in database fields or data items stored in fields in a data structure defined by a computer program. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from web logs, syslogs, or sensor readings. It divides this raw data into "portions," and optionally transforms the data to produce time stamped events. The system stores the time stamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a "tag" may be assigned to two or more fields that contain equivalent data items, even though the fields are associated with different events and possibly different extraction rules. By enabling a single tag (e.g., a field name) to be used to identify equivalent fields from different types of events generated by different data sources, the system facilitates use of a "common information model" (CIM) across the different data sources.

Figure 10:
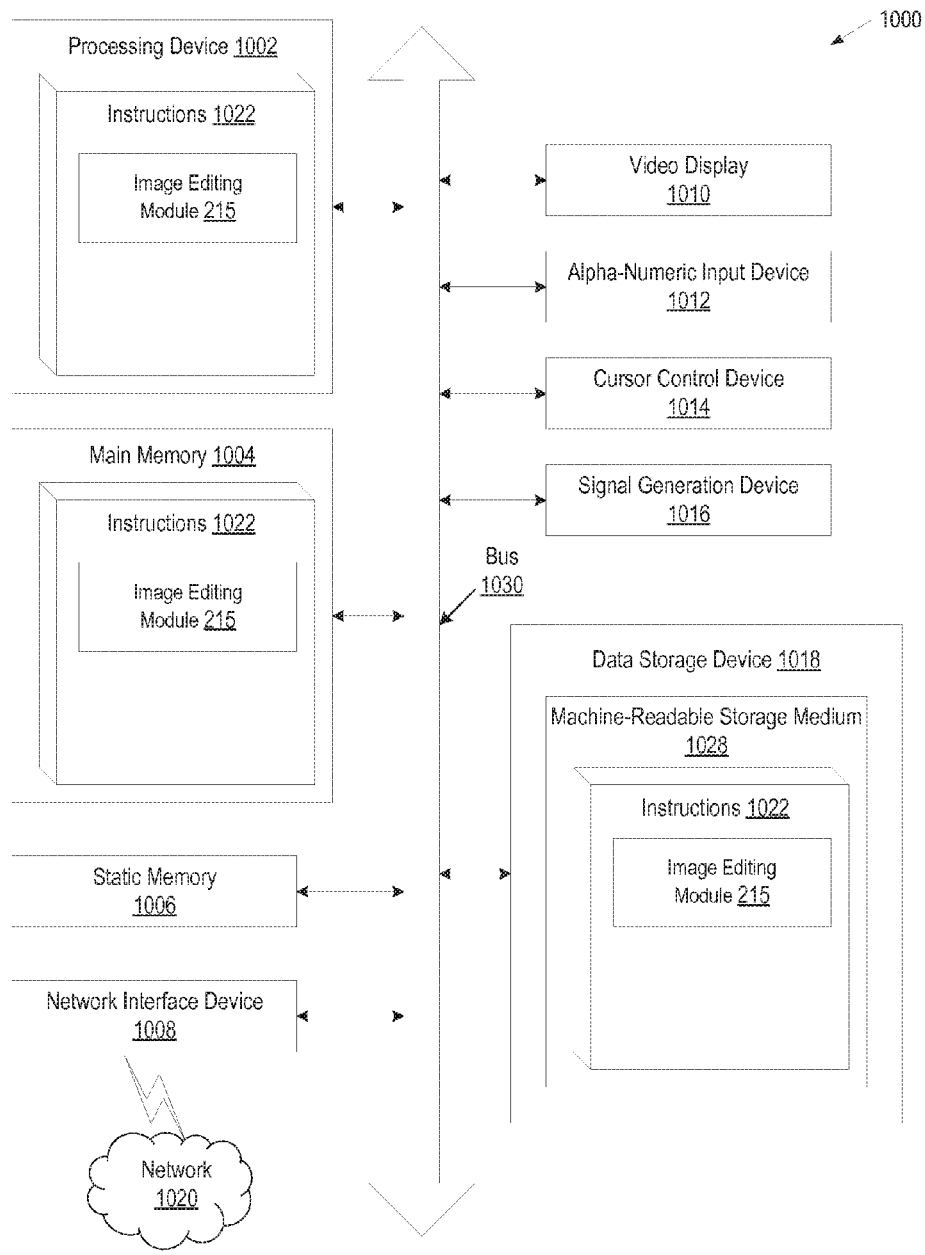
FIG. 10 is a block diagram of an example computer system that may perform one or more of the operations described herein, in accordance with various implementations.

FIG. 10 illustrates a diagram of a machine in an example form of a computer system 1000 within which a set of instructions, for causing the machine to perform any one or more of the methodologies discussed herein, may be executed. The computer system 1000 can be user device 203,205 in FIG. 2. The computer system 1000 can be server machine 240 in FIG. 2. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processing device (processor) 1002, a main memory 1004 (e.g., read-only memory (ROM), flash memory, dynamic random access memory (DRAM) such as synchronous DRAM (SDRAM), double data rate (DDR SDRAM), or DRAM (RDRAM), etc.), a static memory 1006 (e.g., flash memory, static random access memory (SRAM), etc.), and a data storage device 1018, which communicate with each other via a bus 1030.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions 1022 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an input device 1012 (e.g., a keyboard, and alphanumeric keyboard, a motion sensing input device, touch screen), a cursor control device 1014 (e.g., a mouse), and a signal generation device 1016 (e.g., a speaker).

The data storage device 1018 can include a computer-readable storage medium 1028 on which is stored one or more sets of instructions 1022 (e.g., software) embodying any one or more of the methodologies or functions described herein. The instructions 1022 can also reside, completely or at least partially, within the main memory 1004 and/or within the processor 1002 during execution thereof by the computer system 1000, the main memory 1004 and the processor 1002 also constituting computer-readable storage media. The instructions 1022 may further be transmitted or received over a network 1020 via the network interface device 1008.

In one implementation, the instructions 1022 include instructions for an image editing module (e.g., an image editing module 215 in FIG. 2) and/or a software library containing methods that call the image editing module. While the computer-readable storage medium 1028 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "creating", "replacing", "determining", "performing", "defining", "executing", "generating", "transforming", "superimposing", "creating", "sharing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   receiving, by a processing device, input representing a selection of a first area of an image;
   determining, by the processing device, whether the first selected area of the image corresponds to a blurred area previously created for a second selected area of the image, the blurred area previously created for the second selected area of the image having a size that is less than a size of the image; and responsive to determining that the first selected area of the image corresponds to the blurred area previously created for the second selected area of the image, replacing, by the processing device, the first selected area of the image with a corresponding portion of the blurred area previously created for the second selected area of the image.

2. The method of claim 1, wherein the blurred area is created by:
  determining that the second selected area comprise a plurality of separate sub-areas; and
  performing a single blur operation to create a single result image corresponding to the plurality of separate sub-areas, wherein performing the single blur operation to create the single result image minimizes a number of blur operations being performed relative to applying a same blur filter to the plurality of separate sub-areas.

3. The method of claim 1, wherein the blurred area is created by:
  defining an area of the image that encompasses the second selected area; and
  executing a single blur operation using pixels in the defined area as input to a blur filter, the blur filter being one of a Gaussian filter, a motion filter, a box filter, a spin filter, or a zoom filter.

4. The method of claim 1, wherein the first selected area of the image comprises data to be protected, the data being derived from a data store.

5. The method of claim 1, wherein the first selected area of the image comprises data derived using a late binding schema.

6. The method of claim 1, wherein the first selected area of the image comprise a plurality of separate areas in the image, and the blurred area corresponds to a blurring of a single portion of the image that contains the plurality of separate areas in the image.

7. The method of claim 1, wherein the first selected area comprises an irregular shape.

8. The method of claim 1, wherein receiving input of the first selected area of the image comprises:
  generating a dashboard image using data extracted via a late binding schema, wherein the dashboard image is generated at a particular point in time and comprises data corresponding to the particular point in time; and
  receiving a selection of the data to be blurred in the dashboard image.

9. The method of claim 1, wherein replacing the first set of selected areas with the corresponding portion of the blurred area comprises:
  transforming the first selected area in the image into transparent areas in a foreground layer; and
  superimposing the image with the transparent areas on top of the blurred area, wherein the blurred area is in a background layer.

10. The method of claim 1, wherein replacing the first selected area with the corresponding portion of the blurred area comprises:
  transforming the blurred area to include a transparent area, the transparent area excluding one or more portions of the blurred area that correspond to the first selected area in the image; and
  superimposing the transformed blurred area on top of the image.

11. The method of claim 1, further comprising:
  creating an edited image, the edited image comprising the e first selected area replaced with the corresponding portion of the blurred area; and
  sharing the edited image, wherein the edited image conceals data to be protected.

12. The method of claim 1, further comprising:
  receiving a request to blur a different selected area of the image, wherein the different selected area comprises a sub-area that is not included in the first selected area; and
  replacing the different selected area of the image with a second corresponding portion of the blurred area.

13. A system comprising:
  a memory to store an image and a blurred area previously created for a first selected area of the image; and
  a processing device coupled with the memory to:
    receive input representing a selection of a second area of the image;
    determine whether the second selected area of the image corresponds to the blurred area previously created for the first selected area of the image, the blurred area previously created for the first selected area of the image having a size that is less than a size of the image; and
    responsive to determining that the second selected area of the image corresponds to the blurred area previously created for the first selected area of the image, replace the second selected area of the image with a corresponding portion of the blurred area previously created for the first selected area of the image.

14. The system of claim 13, wherein the blurred area is created by:
  determining that the first selected area comprise a plurality of separate sub-areas; and
  performing a single blur operation to create a single result image corresponding to the plurality of separate sub-areas, wherein performing the single blur operation to create the single result image minimizes a number of blur operations being performed relative to applying a same blur filter to the plurality of separate sub-areas.

15. The system of claim 13, wherein the second selected area of the image comprises data to be protected, the data being derived from a data store.

16. The system of claim 13, wherein the second selected area of the image comprises data derived using a late binding schema.

17. The system of claim 13, wherein the first selected area of the image comprise a plurality of separate areas in the image, and the blurred area corresponds to a blurring of a single portion of the image that contains the first selected area in the image.

18. The system of claim 13, wherein the blurred area is created by:
  defining an area of the image that encompasses the first selected area; and
  executing a single blur operation using pixels in the defined area as input to a blur filter, the blur filter being one of a Gaussian filter, a motion filter, a box filter, a spin filter, or a zoom filter.

19. The system of claim 13, wherein to replace the second selected area with the corresponding portion of the blurred area comprises:
  transforming the second selected area in the image into a transparent area in a foreground layer; and
  superimposing the image with the transparent area on top of the blurred area, wherein the blurred area is in a background layer.

20. The system of claim 13, wherein the processing device is further to:
   receive a request to blur a different selected area of the image, wherein the different selected area comprises a sub-area that is not included in the second selected area; and
   replace the different selected area of the image with a second corresponding portion of the blurred area.

21. A non-transitory computer readable storage medium encoding instructions thereon that, in response to execution by a processing device, cause the processing device to perform operations comprising:
   receiving, by the processing device, input representing a selection of a first area of an image;
   determining, by the processing device, whether the first selected area of the image corresponds to a blurred area previously created for a second selected area of the image, the blurred area previously created for the second selected area of the image having a size that is less than a size of the image; and
   responsive to determining that the first selected area of the image corresponds to the blurred area previously created for the second selected area of the image, replacing, by the processing device, the first selected area of the image with a corresponding portion of the blurred area previously created for the second selected area of the image.

22. The non-transitory computer readable storage medium of claim 21, wherein the blurred area is created by:
   determining that the second selected area comprise a plurality of separate sub-areas; and
   performing a single blur operation to create a single result image corresponding to the plurality of separate sub-areas, wherein performing the single blur operation to create the single result image minimizes a number of blur operations being performed relative to applying a same blur filter to the plurality of separate sub-areas.

23. The non-transitory computer readable storage medium of claim 21, wherein the first selected area of the image comprises data to be protected, the data being derived from a data store.

24. The non-transitory computer readable storage medium of claim 21, wherein the first selected area of the image comprises data derived using a late binding schema.

25. The non-transitory computer readable storage medium of claim 21, wherein the blurred area is created by:
   defining an area of the image that encompasses the second selected area; and
   executing a single blur operations using pixels in the defined area as input to a blur filter, the blur filter being one of a Gaussian filter, a motion filter, a box filter, a spin filter, or a zoom filter.

26. The non-transitory computer readable storage medium of claim 21, wherein replacing the first selected area with the corresponding portion of the blurred area comprises:
   transforming the first selected area in the image into a transparent area in a foreground layer; and
   superimposing the image with the transparent area on top of the blurred area, wherein the blurred area is in a background layer.

27. The non-transitory computer readable storage medium of claim 21, wherein the operations further comprise:
   receiving a request to blur a different selected area of the image, wherein the different selected area comprises a sub-area that is not included in the first selected area; and
   replacing the different selected area of the image with a second corresponding portion of the blurred area.

* * * * *